United States Patent
Tanaka et al.

[19]

[11] Patent Number: 5,687,764

[45] Date of Patent: Nov. 18, 1997

[54] FOUR-PORT VALVE

[75] Inventors: Ryoichi Tanaka; Mamoru Matsuo; Makoto Miyata, all of Yokohama, Japan

[73] Assignee: Nippon Furnace Kogyo Kabushiki Kaisha, Kanagawa, Japan

[21] Appl. No.: 704,634

[22] PCT Filed: Mar. 9, 1995

[86] PCT No.: PCT/JP95/00391

§ 371 Date: Sep. 4, 1996

§ 102(e) Date: Sep. 4, 1996

[87] PCT Pub. No.: WO95/24577

PCT Pub. Date: Sep. 14, 1995

[30] Foreign Application Priority Data

Mar. 9, 1994 [JP] Japan .................. 6-064375

[51] Int. Cl.$^6$ .................................................. F16K 11/04
[52] U.S. Cl. ............................ 137/625.43; 137/625.44
[58] Field of Search .......................... 137/625.43, 625.44

[56] References Cited

U.S. PATENT DOCUMENTS

| 1,547,471 | 7/1925 | Achern .................. 137/625.44 X |
| 3,973,592 | 8/1976 | Cleaver et al. ................ 137/625.43 |

FOREIGN PATENT DOCUMENTS

| 4416911 | 7/1969 | Japan . |
| 49-118126 | 10/1974 | Japan . |
| 53-40409 | 9/1978 | Japan . |
| 56-30463 | 7/1981 | Japan . |
| 61-21657 | 6/1986 | Japan . |
| 62-65032 | 9/1994 | Japan . |

*Primary Examiner*—John Fox
*Attorney, Agent, or Firm*—Notaro & Michalos P.C.

[57] ABSTRACT

The present invention relates to a four-port valve capable of controlling directions of the flow of two types of fluid. This four-port valve is configured in such a manner as that: the inside of a casing 1 is divided into four chambers 3a, 3b, 3c and 3d by a substantially-X-shaped partition wall 2; two opposed chambers 3d and 3c are determined as fixing chambers communicating with ports respectively connected with two types of passages in which directions of the flow of fluid are fixed while the remaining two opposed chambers 3a and 3b are determined as change-over chambers communicating with ports respectively connected with two types of passages in which directions of the flow of fluid are alternately changed over; valve openings 5ac, 5ad, 5bd and 5bc for communicating two chambers adjacent to the substantially-X-shaped partition wall 2 with each other are provided; a valve plate 6 for closing the valve openings and a drive shaft 8 for supporting and oscillating the valve plate 6 are provided in one chamber while a valve plate 6' for closing the valve openings is provided to the opposed chamber 3c so that valve plate 6' is connected with the valve plate 6 supported by the drive shaft 8 by a semi-circular or circular connecting ring 7 piercing through the valve openings 5ac, 5ad, 5bd and 5bc.

4 Claims, 6 Drawing Sheets

FOUR-PORT VALVE

FIELD OF THE INVENTION

The present invention relates to a four-port valve which has four ports and is suitable for switching directions of the flow of two types of fluid. More particularly, the present invention relates to a four-port valve for controlling directions of the flow of two types of fluid having different temperatures, e.g., a passage for flowing a high-temperature gas such as combustion exhaust gas and a passage for flowing low-temperature gas such as combustion air by changing over the passages to be connected.

BACKGROUND OF THE INVENTION

In recent years, there has been developed a technique for recovering a considerable quantity of heat from exhaust gas utilizing a regenerator to preheat combustion air. For example, there has been proposed a regenerative burner system in which supply of the combustion air to a burner and emission of the combustion exhaust gas from a combustion chamber are alternately carried out through the regenerator and the combustion air is preheated using heat of the combustion exhaust gas accumulated in the regenerator.

In such a regenerative burner system, a four-way passage change-over apparatus is required for switching a passage through which the high-temperature exhaust gas flows with a passage through which the low-temperature combustion air flows to the regenerator to control directions of the flow. Conventionally, four solenoid valves are generally adopted as this passage change-over apparatus in the combustion system, and passages for the high-temperature gas and the low-temperature gas can be changed over by selectively opening and/or closing the solenoid valves provided at four positions. Since the passage change-over apparatus constituted by the solenoid valves however requires a plurality of expensive solenoid valves, the facility cost is disadvantageously increased. In particular, if the apparatus is adopted for heat exchange in the combustion system, a plurality of more expensive solenoid valves for high-temperature use are required, increasing the facility cost. Further, since a dimension of a pneumatic piping solenoid valve is comparatively large, use of four pneumatic piping solenoid valves disadvantageously involves a large space and complicated double piping. Furthermore, when the air and the exhaust gas are frequently switched within one minute, there is a problem in durability of the solenoid valve.

Therefore, it is desired to change over the fluid by a single passage change-over means having a relatively-simple structure. As the single passage change-over means, employment of a four-way change-over valve 101 which is one kind of a four-port valve such as shown in FIGS. 5A and 5B can be generally considered. This four-directional control valve 101 communicates adjacent two ports among four ports 102, 103, 104 and 105 with each other by a change-over valve member 107 rotating in a casing 106 having four ports 102, ..., 105, thereby switching the passages.

However, in the structure of the prior art four-way valve, gaps S1 and S2 must be provided between the directional control valve member 107 and a casing 106 provided therearound in the axial direction and the radial direction so as not to bring the change-over valve member 107 into contact with the inner surface of the casing 106 and, depending on the situation, a sealing mechanism must be provided at the gaps. In particular, if there is a large difference in temperature between the two kinds of fluid, the gaps must be provided in accordance with the high temperature, and the gaps necessarily become larger at the low temperature, resulting in a short pass of the two passages in the valve which may leads to leakage of gas. For example, when this valve is used in the regenerative burner system, the combustion air continuously leaks to the passages of the exhaust gas in the four-way valve and, since a quantity of leakage is not fixed and not clear, an excess air ratio of combustion can not be disadvantageously controlled. Moreover, the great drive force is required depending on the friction when the sealing mechanism is provided.

As one solution for this problem, a flapper-type four-way valve such as shown in FIG. 6 can be considered. The flapper-type four-way valve 201 has partition walls 208 provided on the inner side of the casing 206, and the fluid is prevented from leaking by such a structure as that the change-over valve member 207 is brought into contact with the communicating holes of the partition walls 208 in the rotational direction. Since the change-over valve member 207 is not sealed at an edge in the axial direction and the radial direction, leakage does not occur at the gaps S1 and S2 even if the gaps S1 and S2 are provided. Further, in the case where the two types of fluid have different temperatures, expansion or clearance of the change-over valve member 207 can be satisfactorily obtained because the gaps S1 and S2 are provided, whereby the operational failure can not occur. In this mechanism, however, since rotation of the drive shaft is allowed, a gap S3 must be provided around the shaft, and leakage is thereby made therefrom. In order to avoid this leakage, an expensive sealing mechanism must be provided at the shaft portion. In particular, when a difference in temperature between the two types of fluid is large and one fluid has a high temperature, sealing is difficult and the cost of the sealing mechanism is increased.

DISCLOSURE OF THE INVENTION

It is therefore an object of the present invention to provide a four-port valve capable of controlling directions of the flow of two types of fluid having different temperatures by a simple structure without causing leakage of the fluid. Further, it is another object of the present invention to provide a four-port valve which enables the passage change-over operation at a high speed.

To this end, in a four-port valve having four ports, in which directions of the flow of the fluid flowing through two among four ports provided at opposed positions are fixed, the remaining two ports disposed between the former two ports being selectively communicated with one of the former two ports in a casing to change over the fluid flowing through this port, and directions of the flow of the two types of fluid being switched, the present invention is characterized in that: the inside of the casing is divided into four chambers by a substantially-X-shaped partition wall; opposed two chambers among the four chambers are determined as fixing chambers communicating with the ports respectively connected with two types of passages in which directions of the flow of fluid are fixed while the remaining opposed two chambers are determined as change-over chambers communicating with the ports respectively connected with two types of passages in which directions of the flow of fluid are alternately changed over; valve openings for communicating the two chambers adjacent to the substantially-X-shaped partition wall with each other are provided; a valve plate for closing the valve openings and a drive shaft for supporting and oscillating the valve plate are provided to one among the four chambers and a valve plate for closing the valve openings is provided to the opposed chamber to connect with the valve plate supported by the drive shaft by a semi-circular or circular connecting ring piercing through the valve openings; and the two fixing chambers alternately communicates with different change-over chambers by interlocking the valve plate which oscillates by rotation of the drive shaft with the other valve plate.

Thus, since only one type of fluid flows around the drive shaft provided in one among four chambers, leakage of the fluid does not occur between the two types of passages even though the gap is produced around the drive shaft and no sealing mechanism is provided.

Further, according to the four-port valve of the present invention, it is preferable that the drive shaft is provided substantially at the center of the casing and the partition wall is formed so that one among the four chambers divided by the substantially-X-shaped partition wall accommodates the drive shaft. In this case, since oscillation of the two valve plates is symmetric, the valve structure can be made simple.

Furthermore, in the four-way passage change-over apparatus according to the present invention, it is preferable that the drive shaft is provided in the chamber through which the fluid having a low temperature flows if the two types of fluid have different temperatures. In such a case, the bearing can be maintained at a low temperature, thereby improving the durability and others.

BEST STATES FOR EMBODYING THE INVENTION

Figure 1A:
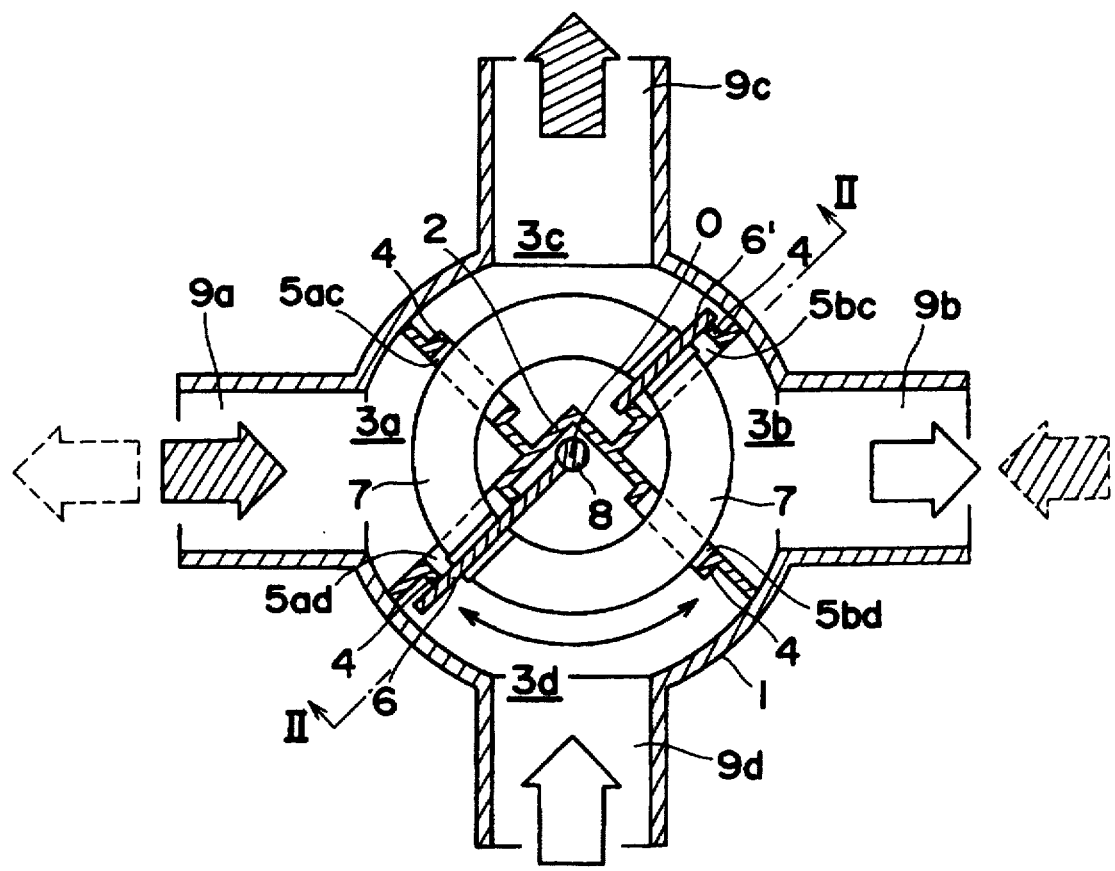
FIG. 1A is a central vertical cross sectional view showing an embodiment of a four-port valve according to the present invention.

The structure of the present invention will now be described in detail hereinbelow with reference to the drawings.

FIG. 1A to FIG. 3 show an embodiment of a four-port valve according to the present invention. According to the four-port valve of this embodiment, the inside of a casing 1 is divided by a substantially-X-shaped partition wall 2 into four chambers 3a, 3b, 3c and 3d, and two opposed chambers among the divided four chambers, e.g., chambers 3d and 3c are determined as first and second fixing chambers communicating with ports 9d and 9c respectively connected with two passages in which directions of the flow of fluid are fixed, while remaining two opposed chambers, e.g., chambers 3a and 3b are determined as first and second change-over chambers communicating with ports 9a and 9b respectively connected with two passages in which directions of the flow of fluid are alternately changed over. On each wall of the substantially-X-shaped partition wall 2 are formed valve openings 5ac, 5ad, 5bc and 5bd for respectively communicating two adjacent chambers with each other, i.e., the chambers 3a and 3c, the chambers 3a and 3d, the chambers 3b and 3c and the chambers 3b and 3d, and the four chambers 3a, 3b, 3c and 3d communicate with each other. In this embodiment, the partition wall 2 is formed into substantially an X shape by an inverse V-shaped or inverse U-shaped wall which forms one chamber, e.g., the chamber 3d so as to enter an opposed chamber, e.g., the chamber 3c over a center 0 of the casing 1 and a wall so provided as to be diagonal to a slant face at a position shifted to a lower position of a top portion of the inverse V- or U-shaped wall.

A drive shaft 8 is provided in any one of the four chambers 3a, 3b, 3c and 3d divided by the X-shaped partition wall 2. If the two types of fluid have different temperatures, the drive shaft 8 may be preferably provided to a chamber connected to a low-temperature passage. With this structure, the bearing can be maintained at a low temperature. For example, when changing over the flow of the combustion air and the flow of the combustion exhaust gas having a relatively-higher temperature than that of the combustion air which has passed through a regenerator for heat exchange in the four-port valve in FIG. 1A, it is preferable that the combustion air which is the low temperature fluid is constantly fed into the chamber 3d while the combustion exhaust gas which is the high-temperature fluid is supplied from the chamber 3d. One valve plate 6 is disposed to the drive shaft 8 for direct driving. The other valve plate 6' is connected with the valve plate 6 disposed to the drive shaft 8 by a connecting ring circularly constituted by a semi-circular connecting ring 7 piercing through the valve openings 5ac and 5ad and another semi-circular connecting ring 7 piercing through the valve openings 5bd and 5bc. With this configuration, the flow of fluid among the four chambers 3a, 3b, 3c and 3d is enabled only through the valve openings 5ac, 5ad, 5bd and 5bc on the respective walls, and the valve openings are blocked and sealed by overlapping these portions on the valve plates 6 and 6'. Further, only one kind of fluid always flows through the chamber 3d accommodating the drive shaft 8. Thus, the high-temperature sealing is unnecessary around the drive shaft 8 at which leakage may occur. Moreover, the valve plates can be expanded and/or contracted in the radial and axial directions without restraint by this mechanism, causing no leakage of the fluid. In this case, the valve plate 6' is supported by the valve plate 6 provided to the drive shaft 8 by means of the connecting ring 7, and expansion and contraction of the respective semi-circular connecting rings necessarily act in a direction along which the valve plate 6' is pressed against the valve openings when the valve plate 6 is pressed against the valve openings on the X-shaped partition wall 2 in a sealing manner even though expansion and contraction are caused by a difference in temperature of the two types of fluid flowing through the respective chambers 3a, 3b, 3c and 3d, whereby occurrence of leakage is difficult.

The drive shaft 8 for supporting and rotating the valve plate 6 is rotatably provided at a center of the casing 1 by utilizing a non-illustrated bearing or a shaft seal. Note that each of the valve openings 5ac, 5ad, 5bd and 5bc is formed at such a position as that they are completely blocked at oscillating ends of the valve plates 6 and 6'. In other words, a sealing surface where the respective valve openings 5ac, 5ad, 5bd and 5bc are brought into contact with the valve plates 6 and 6' is provided on X-shaped two planes extending over a rotational center of the drive shaft 8. In addition, to the first and second fixing chambers 3d and 3c and the first and second change-over chambers 3a and 3b are formed ports 9d, 9c, 9a and 9b for connecting ducts constituting the respective passages. The two kinds of passages (ducts) in which directions of the flow of the fluid are fixed are respectively connected to the first and second fixing chambers 3d and 3c, and the two types of passages (ducts) in which directions of the flow of fluid are alternately changed over are connected to the first and second change-over chambers 3a and 3b. A sealing member (not shown) may be preferably fixed to edges of the respective valve openings 5ac, 5ad, 5bd and 5bc or one or both of the valve plates 6 and 6' to increase air tightness. In this embodiment, plane valve seats 4 protruding toward the surfaces against which the valve plates 6 and 6' are pressed are formed on the edges of the valve openings 5ac, 5ad, 5bd and 5bc. Note that the drive shaft 8 is driven by a non-illustrated actuator.

Switching of the passages by the four-port valve having the above-described structure is carried out in the following manner. The description will be given as to this operation in the case where directions of the flow of the two types of fluid, i.e., the supply fluid and exhaust fluid having the flowing directions opposed to each other are controlled.

For example, the supply fluid, e.g., the low-temperature combustion air flows into the first fixing chamber 3d, while the exhaust fluid, e.g., the high-temperature combustion exhaust gas flows out from the second fixing chamber 3c. In the illustrated state, the fluid led into the first fixing chamber 3d flows into the second change-over chamber 3b through the valve opening 5bd of the partition wall 2, and is supplied to any portion, where air supply is required, through a non-illustrated duct or the like connected with the port 9b of the second change-over chamber 3b. Meanwhile, the exhaust gas is attracted from an exhaust source or the like through the duct connected to the port 9a of the first change-over chamber 3a by, e.g., an induced draft fan provided in the exhaust system to be led into the first change-over chamber 3a, and the exhaust gas is then emitted to a passage/exhaust system connected to the port 9c of the second fixing chamber 3c through the same chamber 3c through the valve opening 5ac.

Figure 1B:
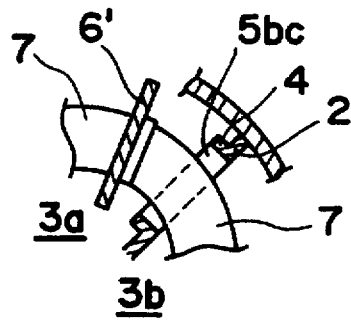
FIG. 1B is a cross sectional view showing the relation between a valve plate and a partition wall of the four-port valve with a valve opening being slightly opened.
Figure 2:
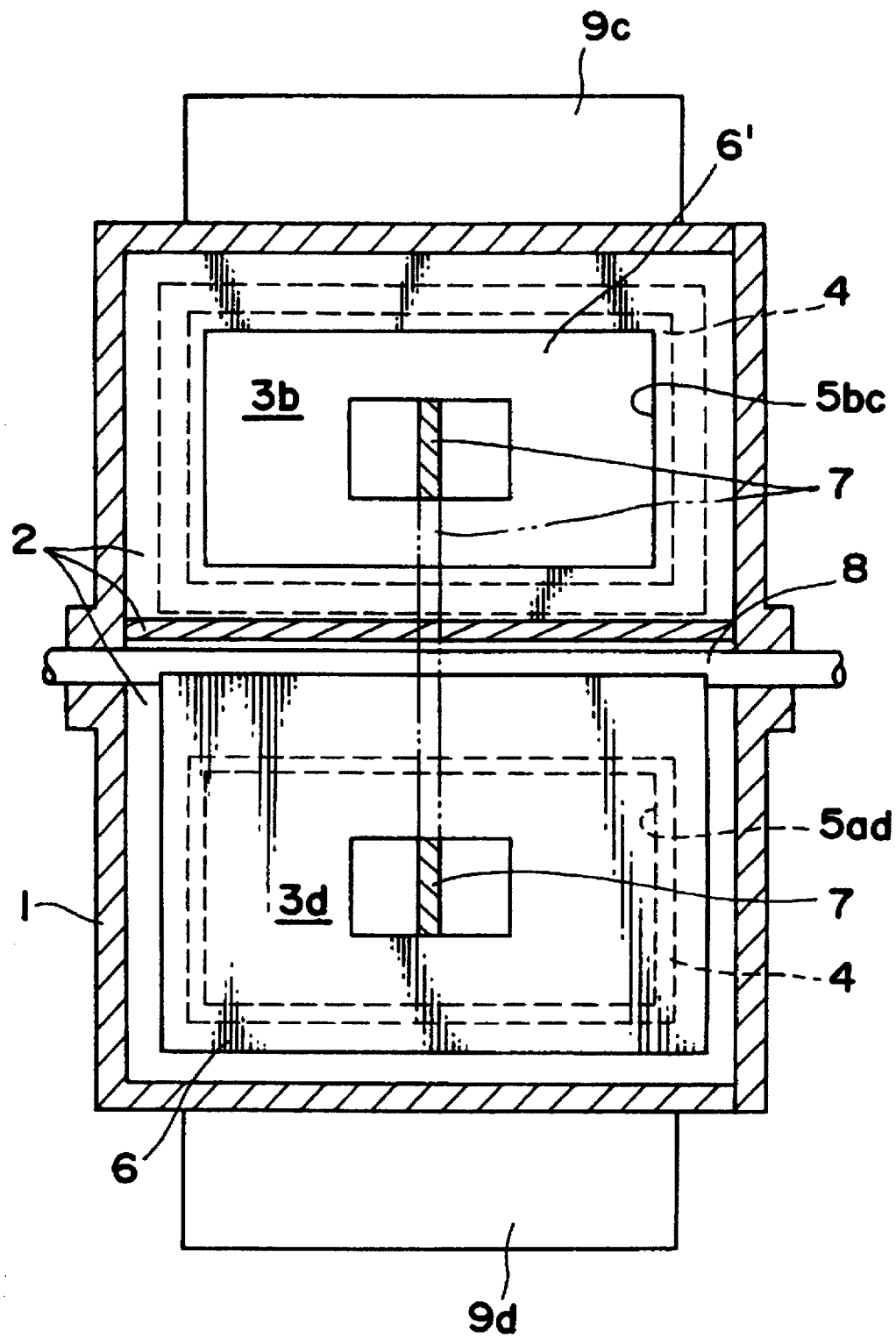
FIG. 2 is a cross sectional view taken along a II—II line in FIG. 1A.
Figure 3:
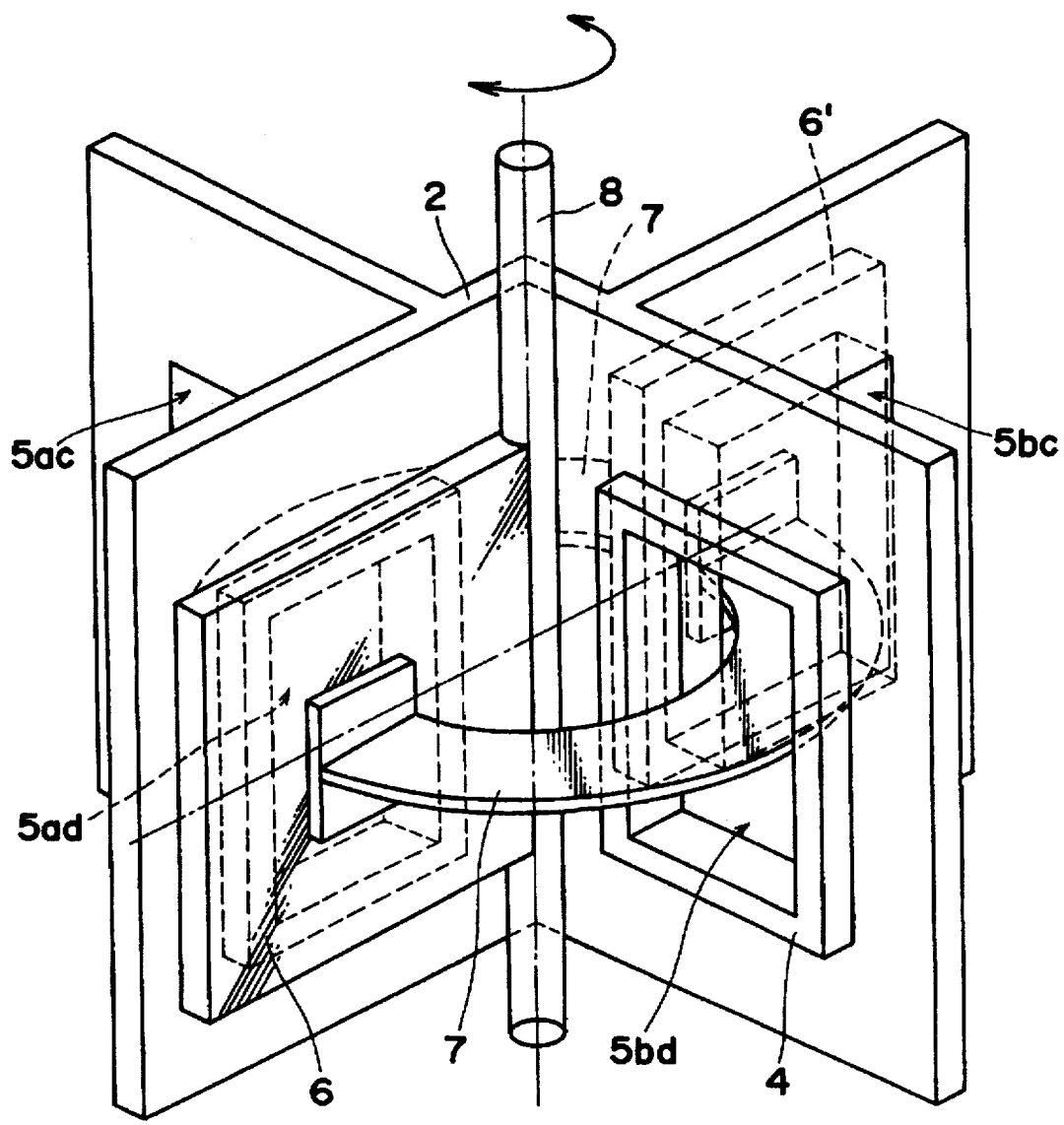
FIG. 3 is a perspective view showing the relation between the partition wall and change-over valve plates of the four-port valve illustrated in FIGS. 1.

When the drive shaft 8 is subsequently rotated from the state shown in FIG. 1A in the counterclockwise direction, the valve plates 6 and 6' are moved away from the valve openings 5ad and 5bc so that the valve openings 5ad and 5bc are opened and the valve openings 5ac and 5bd on the opposed side are closed as shown in FIG. 1B. The fluid, e.g., the combustion air flowing from the port 9d to the first fixing chamber 3d then flows into the first change-over chamber 3a through the valve opening 5ad to be supplied to the passage connected with the port 9a. On the other hand, the exhaust fluid, e.g., the combustion exhaust gas attracted into the second change-over chamber 3b from the port 9c through the port 9b passes through the second fixing chamber 3c through the valve opening 5bc to be emitted.

In regard of switching of directions of the flow of fluid by the four-port valve having such a structure, since the four chambers in the casing i are completely partitioned by the substantially-X-shaped partition wall 2, leakage of the fluid does not occur in the two passages within the casing.

The four-port valve 1 having such a structure can be applied to regenerative burner system disclosed in, for example, International laid-open publication No. WO94102784.

Figure 4A:
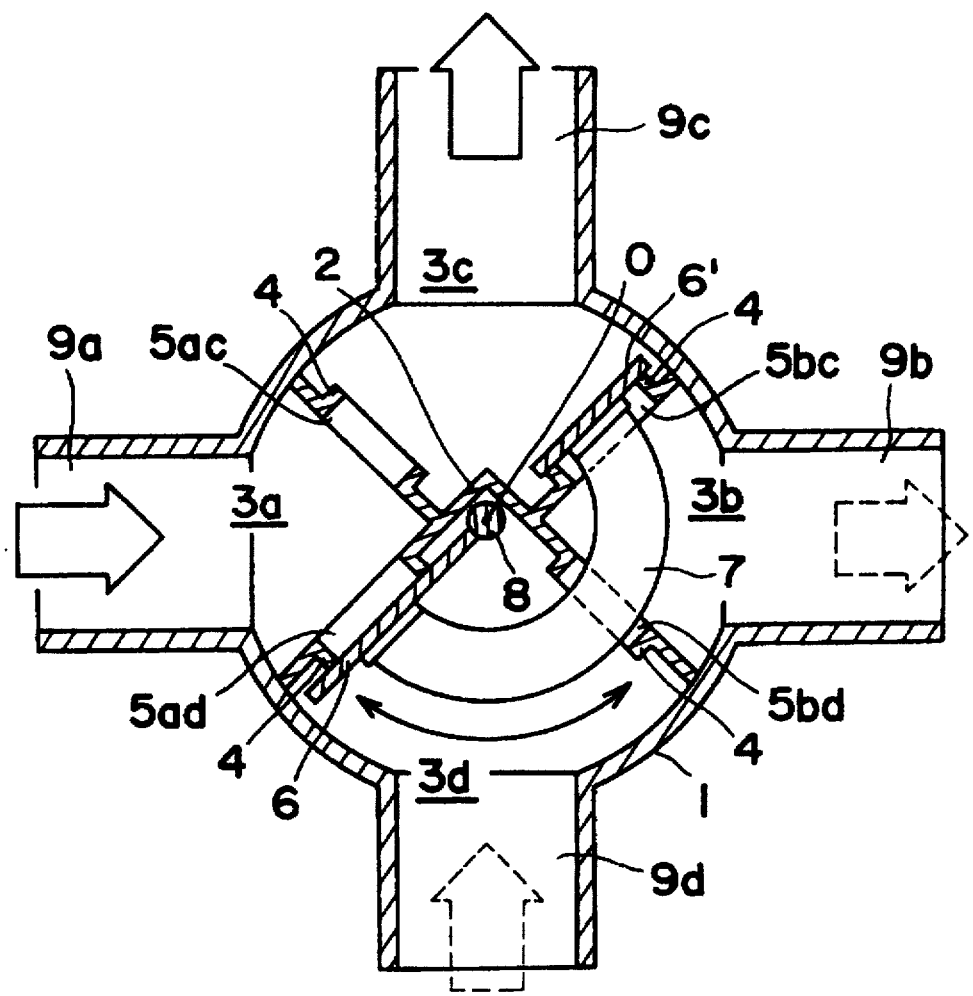
FIG. 4A is a central vertical cross section showing another embodiment of the four-port valve according to the present invention.
Figure 4B:
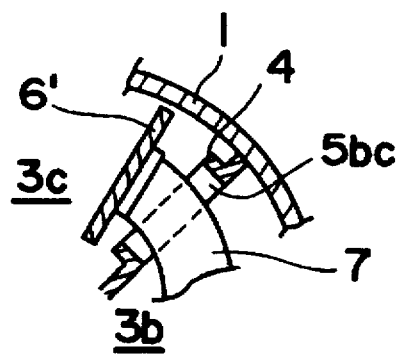
FIG. 4B is a cross section showing the relation between the valve plate and the partition wall of the four-port valve with a valve opening being slightly opened.
Figure 5A:
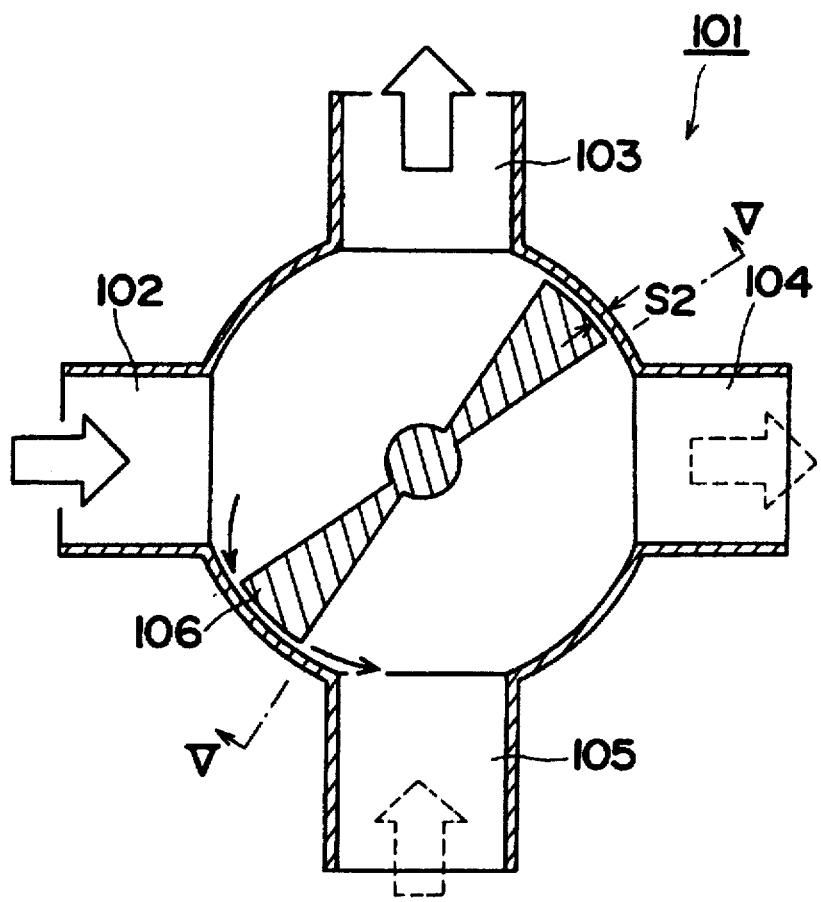
FIG. 5A is a schematic vertical cross section showing a prior art four-way change-over valve.
Figure 5B:
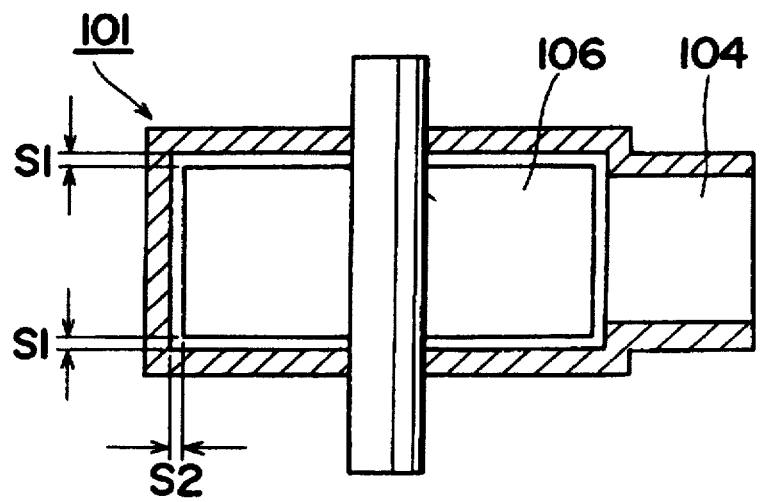
FIG. 5B is a cross section taken along a V—V line in FIG. 5A.
Figure 6:
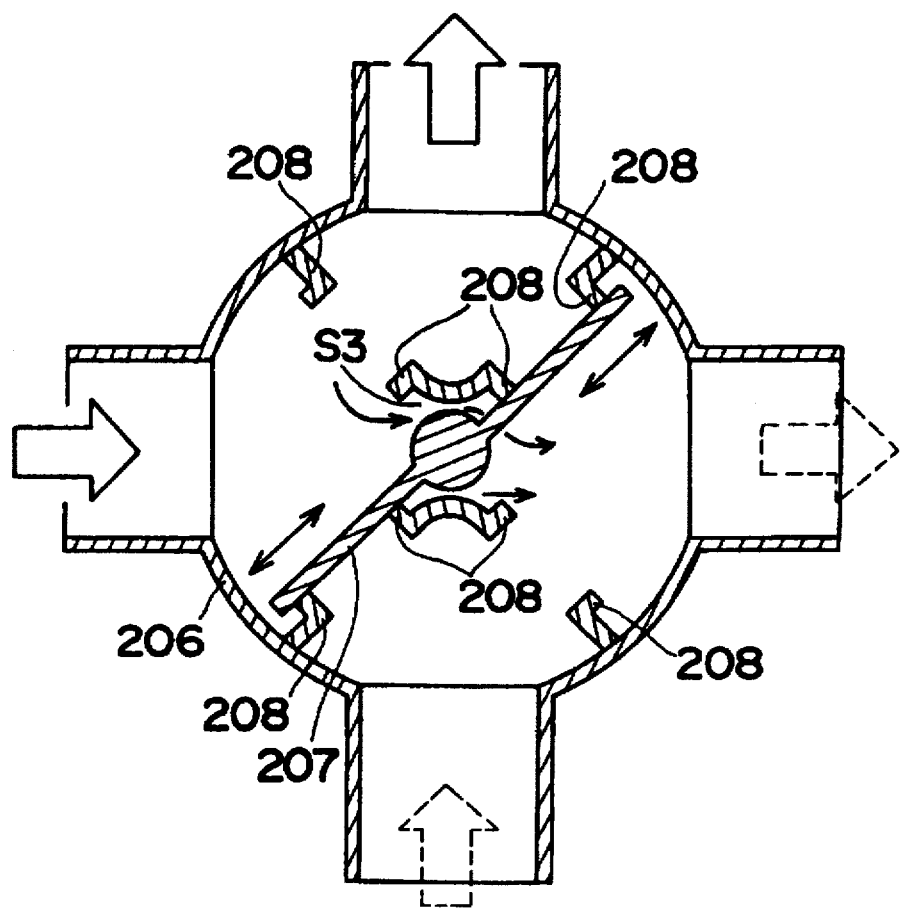
FIG. 6 is a schematic view showing a prior art flapper valve.

Although the above-description has been given as to a preferred embodiment, this is not restricted thereto, and various modifications are possible within a true scope of the present invention. For example, in the present embodiment, two semi-circular rings 7 are adopted and fixed to the front and rear portions of the valve plate 6 supported by the drive shaft 8 and the valve plate 6' not supported by the drive shaft 8 to constitute one circular ring as a whole, but the present invention is not limited to this configuration and the two valve plates 6 and 6' may be connected to each other using only one semi-circular ring 7 as shown in FIG. 4A.

Further, although the description has been given as to the embodiment on the assumption that one passage is connected to each of the ports 9a, 9b, 9c and 9d, the present invention is not restricted to this structure, and two or more passages may be connected to one port as long as the same type of fluid flows through these passages. In other words, if one type of passage is connected to one chamber, a plurality of passages may be used.

Furthermore, although the gas having a high temperature and the gas having a relatively-low temperature are exemplified as two types of fluid in the description of the present embodiment, the invention is not restricted to this structure and may be used for switching passages of the fluid having thermal energy and the fluid having an ordinary temperature or for changing over passages of the two types of fluid having different substances and no difference in temperature.

Moreover, the description has been given as to the embodiment in which the two systems having flowing directions opposed to each other, e.g., the supply system and the exhaust system are used as two systems having fixed directions of the flow of fluid, but the invention is not limited to this configuration, and the fluid may flow through the two systems in the same direction.

In addition, although the each of the valve openings 5ac, 5ad, 5bc and 5bd is formed by one circular hole, the invention is not restricted to this structure. The hole may have any shape other than circle, e.g., square or triangle, and a set of multiple holes may be also adopted. Even if a plurality of holes which are opened and/or closed by one valve plate or a part of a disc are used, these are recognized as one hole.

What is claimed is:

1. A four-port valve which has four ports and in which directions of the flow of fluid passing through the ports provided on the two opposed positions are fixed and the other two ports provided between said ports are selectively communicated with either of said two ports in a casing to change over the fluid passing through the ports, the four-port valve characterized in that: the inside of the casing is divided into four chambers by a substantially-X-shaped partition wall; the opposed two of the four chambers are determined as fixing chambers communicating with the ports respectively connected with two types of passages in which directions of the flow of fluid are fixed while the remaining two opposed chambers are determined as change-over chambers communicating with the ports respectively connected with two types of passages in which directions of the flow of fluid are alternately changed over; valve openings for communicating two chambers adjacent to the substantially-X-shaped partition wall with each other are provided; a valve plate for closing the valve openings and a drive shaft for supporting and oscillating the valve plate are provided to one among the four chambers while a valve plate for closing the valve openings is provided to the opposed chamber so as to be connected with the valve plate supported by the drive shaft by a semi-circular or circular connecting ring piercing through the valve openings; and the valve plate oscillating by rotation of the drive shaft is interlocked with the other valve plate to alternately communicate the two fixing chambers with the different change-over chambers.

2. A four-port valve as set forth in claim 1, wherein the drive shaft is provided substantially at a center of the casing, and the substantially-X-shaped partition wall is formed in such a manner that one among the four chambers divided by the partition wall accommodates the drive shaft therein.

3. A four-port valve as set forth in claim 1, wherein the drive shaft is provided in a chamber through which a low-temperature fluid flows if the two types of fluid have different temperatures.

4. A four part valve as set forth in claim 2, wherein the drive shaft is provided in a chamber through which a low-temperature fluid flows if the two types of fluid have different temperatures.

* * * * *